US012665235B2

(12) United States Patent
Rhim et al.

(10) Patent No.: US 12,665,235 B2
(45) Date of Patent: Jun. 23, 2026

(54) BATTERY PACK AND DEVICE INCLUDING THE SAME

(71) Applicant: LG ENERGY SOLUTION, LTD., Seoul (KR)

(72) Inventors: Soeun Rhim, Daejeon (KR); Hyongseok Yoo, Daejeon (KR); Donghyun Kim, Daejeon (KR); Hyoungsuk Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 623 days.

(21) Appl. No.: 18/024,849

(22) PCT Filed: Feb. 17, 2022

(86) PCT No.: PCT/KR2022/002330
§ 371 (c)(1),
(2) Date: Mar. 6, 2023

(87) PCT Pub. No.: WO2022/203208
PCT Pub. Date: Sep. 29, 2022

(65) Prior Publication Data
US 2023/0344034 A1      Oct. 26, 2023

(30) Foreign Application Priority Data
Mar. 24, 2021      (KR) ........................ 10-2021-0038294

(51) Int. Cl.
H01M 10/658        (2014.01)
H01M 10/613        (2014.01)
(Continued)

(52) U.S. Cl.
CPC ..... H01M 10/6554 (2015.04); H01M 10/613 (2015.04); H01M 10/658 (2015.04);
(Continued)

(58) Field of Classification Search
CPC ............. H01M 10/613; H01M 10/625; H01M 10/647; H01M 10/653; H01M 10/6551;
(Continued)

(56) References Cited

U.S. PATENT DOCUMENTS

2013/0149582 A1      6/2013   Kimura et al.
2015/0171493 A1      6/2015   Freese et al.
(Continued)

FOREIGN PATENT DOCUMENTS

DE      10 2012 209 306 A1      12/2013
DE      10 2018 222 706 A1      6/2020
(Continued)

OTHER PUBLICATIONS

JP2021015703A Machine translation from google patents (Year: 2025).*
(Continued)

*Primary Examiner* — Lingwen R Zeng
(74) *Attorney, Agent, or Firm* — Birch, Stewart, Kolasch & Birch, LLP

(57) ABSTRACT

An exemplary embodiment provides a battery pack including: a pack frame configured to accommodate a plurality of battery modules; a heat sink positioned on lower surfaces of the battery modules; and a heat transfer member positioned between the heat sink and the lower surfaces of the battery modules. An insulating member is attached to at least one end portion of the heat sink.

17 Claims, 3 Drawing Sheets

(51) Int. Cl.

| | |
|---|---|
| *H01M 10/6554* | (2014.01) |
| *H01M 50/211* | (2021.01) |
| *H01M 10/625* | (2014.01) |
| *H01M 10/647* | (2014.01) |
| *H01M 10/653* | (2014.01) |
| *H01M 10/6551* | (2014.01) |
| *H01M 10/6555* | (2014.01) |
| *H01M 50/204* | (2021.01) |
| *H01M 50/209* | (2021.01) |
| *H01M 50/224* | (2021.01) |
| *H01M 50/24* | (2021.01) |
| *H01M 50/249* | (2021.01) |
| *H01M 50/293* | (2021.01) |
| *H01M 50/593* | (2021.01) |

(52) U.S. Cl.
CPC ........ *H01M 50/211* (2021.01); *H01M 10/625* (2015.04); *H01M 10/647* (2015.04); *H01M 10/653* (2015.04); *H01M 10/6551* (2015.04); *H01M 10/6555* (2015.04); *H01M 50/204* (2021.01); *H01M 50/209* (2021.01); *H01M 50/224* (2021.01); *H01M 50/24* (2021.01); *H01M 50/249* (2021.01); *H01M 50/293* (2021.01); *H01M 50/593* (2021.01); *H01M 2220/20* (2013.01); *Y02E 60/10* (2013.01)

(58) Field of Classification Search
CPC ......... H01M 10/6554; H01M 10/6555; H01M 10/658; H01M 2220/20; H01M 50/204; H01M 50/209; H01M 50/211; H01M 50/224; H01M 50/24; H01M 50/249; H01M 50/293; H01M 50/593; Y02E 60/10

See application file for complete search history.

(56) References Cited

U.S. PATENT DOCUMENTS

| | | |
|---|---|---|
| 2016/0329617 A1 | 11/2016 | Omura et al. |
| 2016/0372805 A1* | 12/2016 | Kim .................... H01M 50/204 |
| 2018/0175464 A1 | 6/2018 | Kim et al. |
| 2020/0185795 A1 | 6/2020 | Park et al. |
| 2021/0218082 A1 | 7/2021 | Kubota et al. |
| 2021/0351456 A1 | 11/2021 | Yamamoto |
| 2022/0052391 A1 | 2/2022 | Kim et al. |
| 2022/0328922 A1 | 10/2022 | Ogino et al. |

FOREIGN PATENT DOCUMENTS

| | | |
|---|---|---|
| JP | 2013-122818 A | 6/2013 |
| JP | 2013-125617 A | 6/2013 |
| JP | 5456371 B2 | 3/2014 |
| JP | 2021-15703 A | 2/2021 |
| JP | 2021015703 A * | 2/2021 |
| JP | WO2020/066060 A1 | 3/2021 |
| KR | 10-2015-0100365 A | 9/2015 |
| KR | 10-1579483 B1 | 12/2015 |
| KR | 10-2018-0040922 A | 4/2018 |
| KR | 10-1935013 B1 | 1/2019 |
| KR | 10-2020-0102194 A | 8/2020 |
| KR | 10-2020-0142242 A | 12/2020 |
| WO | WO 2012/117681 A1 | 9/2012 |
| WO | WO 2020/152858 A1 | 7/2020 |
| WO | WO 2021/039957 A1 | 3/2021 |

OTHER PUBLICATIONS

Extended European Search Report for European Application No. 22775910.7, dated Mar. 1, 2024.
International Search Report (PCT/ISA/210) issued in PCT/KR2022/002330, dated Jun. 3, 2022.

* cited by examiner

【Figure 1】
100
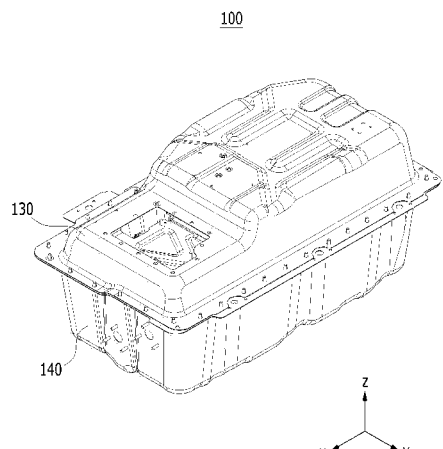
130
140
【Figure 2】
100
130
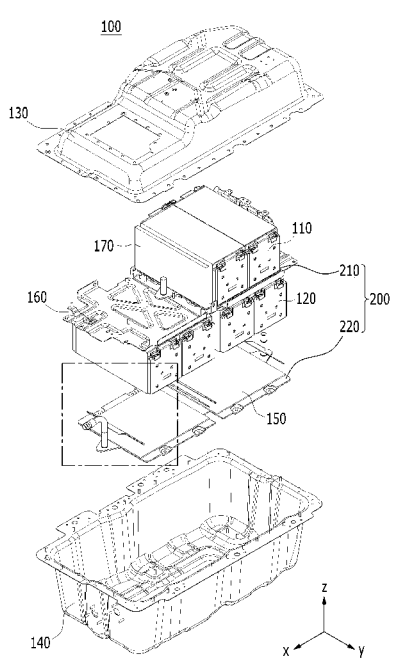
170
110
210
160
120
200
220
150
140

【Figure 3】
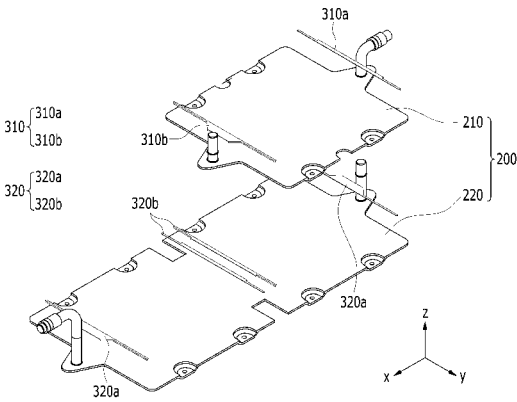
【Figure 4】
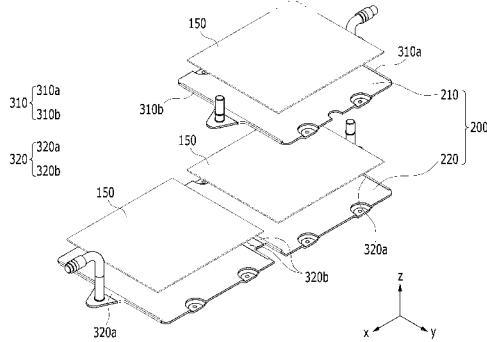
【Figure 5】
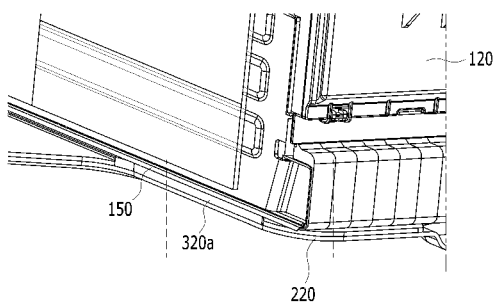

【Figure 6】
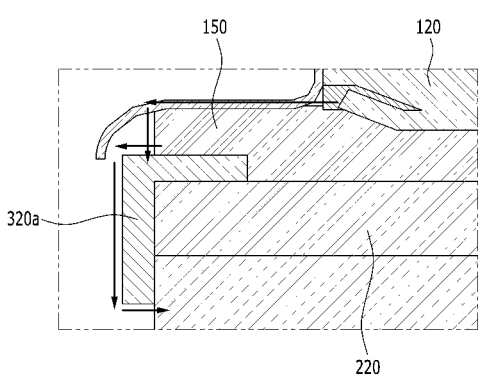
【Figure 7】
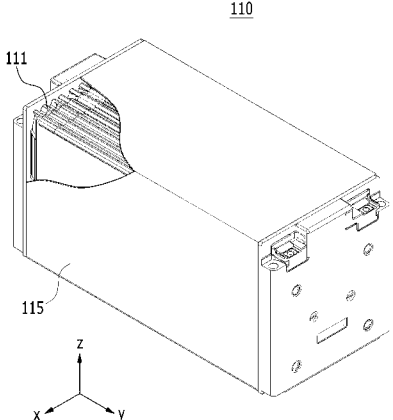

BATTERY PACK AND DEVICE INCLUDING THE SAME

CROSS-REFERENCE TO RELATED APPLICATION(S)

This application claims priority to and the benefit of Korean Patent Application No. 10-2021-0038294 filed in the Korean Intellectual Property Office on Mar. 24, 2021, the entire contents of which are incorporated herein by reference.

TECHNICAL FIELD

The present invention relates to a battery pack and a device including the same, and more particularly, to a battery pack having improved insulation performance and safety, and a device including the same.

BACKGROUND ART

A secondary battery has high applicability according to a product line and has electrical characteristics such as high energy density, and thus it is widely used in electric vehicles or hybrid vehicles driven by electric driving sources, power storage devices, and the like, as well as portable devices. Such a secondary battery is attracting attention as a new energy source for eco-friendliness and energy efficiency enhancement thanks to not only a primary advantage of significantly reducing use of fossil fuels but also by-products that are not generated from the use of energy at all.

Currently commercially available rechargeable batteries include a nickel cadmium battery, a nickel hydrogen battery, a nickel zinc battery, and a lithium rechargeable battery, and among them, the lithium rechargeable battery has little memory effect compared to nickel-based rechargeable batteries, so it is in the spotlight as it is freely charged and discharged, has a very low self-discharge rate, and has high energy density.

In general, a lithium secondary battery may be classified into a cylindrical or prismatic secondary battery in which an electrode assembly is embedded in a metal can, and a pouch-type secondary battery in which an electrode assembly is embedded in a pouch of an aluminum laminate sheet depending on a shape of an exterior material.

Recently, as a need for a large-capacity secondary battery structure, including use of secondary batteries as an energy storage source, increases, a demand for a battery pack having a medium-to-large module structure in which a battery module in which a plurality of secondary batteries are connected in series or in parallel is assembled is increasing. In such a battery module, a plurality of battery cells are connected in series or parallel to each other to form a battery cell stack, thereby improving capacity and output. In addition, a plurality of battery modules may be mounted together with various control and protection systems, such as a battery management system (BMS) and a cooling system, to constitute a battery pack.

Particularly, the battery pack has a structure in which a plurality of battery modules are combined, so that some battery modules are mounted in a pack frame of the battery pack, and it is necessary to secure sufficient insulation distances between each battery module and the pack frame.

Recently, as a battery module and a battery pack are applied to a high performance vehicle, a demand for a high voltage module and pack is increasing. Particularly, the battery pack has a structure in which a plurality of battery modules are combined, so that some battery modules are mounted in a pack frame of the battery pack, and it is necessary to secure sufficient insulation distances between each battery module and the pack frame. Accordingly, it is necessary to develop a battery pack that satisfies an insulation design reference of a high voltage pack by raising a level of insulation distance/creepage distance.

DISCLOSURE

Technical Problem

The present invention has been made in an effort to provide a battery pack having improved insulation performance and a device including the same.

The problem to be solved by the present invention is not limited to the above-mentioned problems, and the problems not mentioned will be clearly understood by those of ordinary skill in the art to which the present invention belongs from the present specification and the accompanying drawings.

Technical Solution

An exemplary embodiment of the present invention provides a battery pack including: a pack frame configured to accommodate a plurality of battery modules; a heat sink positioned on lower surfaces of the plurality of battery modules; and a heat transfer member positioned between the heat sink and the lower surfaces of the plurality of battery modules, wherein an insulating member may be attached to at least one end portion of the heat sink.

At least a portion of the insulating member may be positioned between the heat transfer member and the heat sink.

At least a portion of the insulating member may cover an edge of the at least one end portion of the heat sink.

At least a portion of the insulating member may extend along a side surface of the at least one end portion of the heat sink.

The plurality of battery modules may include first battery modules and second battery modules, the first battery modules may be mounted in an upper portion of the pack frame, and the second battery modules may be mounted in a lower portion of the pack frame.

The heat sink may include a first heat sink and a second heat sink, and the first heat sink may be positioned on lower surfaces of the first battery modules, and the second heat sink may be positioned on lower surfaces of the second battery modules.

The insulating member may include a first insulating member and a second insulating member, the first insulating member may be attached to at least one end portion of the first heat sink, and the second insulating member may be attached to at least one end portion of the second heat sink.

It may further include a horizontal plate positioned between the first heat sink and upper portions of the second battery modules.

A number of the second battery modules may be greater than a number of the first battery modules.

The second heat sink may have a pair of heat sinks are positioned side by side to be connected to each other.

The heat transfer member may be positioned on each of the pair of heat sinks, to be spaced from each other.

The second insulating member may be attached to each of opposite end portions of the pair of heat sinks.

A device according to another embodiment of the present invention includes the battery pack described above.

The insulating member may have an L-shaped cross section and contact an upper surface and side surface of the heat sink.

The second insulating member may have edge sections extending along ends of the second heat sink and central portions extending across the second heat sink between the ends of the second heat sink.

The second insulating member may have an L-shaped cross section and contact an upper surface and side surface of the second heat sink.

The heat transfer member may contact a top surface of the heat sink and a top surface of the insulating member.

Advantageous Effects

According to the embodiments of the present invention, in a battery pack and a device including the same, since an insulating member is attached between a heat sink and a heat transfer member, insulating performance may be improved.

Effects of the present invention are not limited to the above-mentioned effects, and the effects not mentioned will be clearly understood by those of ordinary skill in the art to which the present invention belongs from the present specification and the accompanying drawings.

DESCRIPTION OF THE DRAWINGS

FIG. 1 illustrates a perspective view of a battery pack according to an embodiment of the present invention.

FIG. 2 illustrates an exploded perspective view of the battery pack of FIG. 1.

FIG. 3 illustrates an exploded perspective view of an insulating member attached to a heat sink included in the battery pack of FIG. 1 by disassembling the insulating member.

FIG. 4 illustrates an exploded perspective view of a heat transfer member positioned on the heat sink of FIG. 3 by disassembling the heat transfer member.

FIG. 5 illustrates an enlarged view of a dotted line area in a state in which components of FIG. 2 are coupled.

FIG. 6 schematically illustrates a cross-section of the dotted line area of FIG. 5.

FIG. 7 illustrates a perspective view of a first battery module of FIG. 2.

MODE FOR INVENTION

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

To clearly describe the present invention, parts that are irrelevant to the description are omitted, and like numerals refer to like or similar constituent elements throughout the specification.

Further, since sizes and thicknesses of constituent members shown in the accompanying drawings are arbitrarily given for better understanding and ease of description, the present invention is not limited to the illustrated sizes and thicknesses. In the drawings, the thicknesses of layers, films, panels, regions, etc., are exaggerated for clarity. In the drawings, for better understanding and ease of description, the thicknesses of some layers and areas are exaggerated.

In addition, throughout the specification, unless explicitly described to the contrary, the word "comprise" and variations such as "comprises" or "comprising" will be understood to imply the inclusion of stated elements but not the exclusion of any other elements.

Further, throughout the specification, the phrase "in a plan view" means when an object portion is viewed from above, and the phrase "in a cross-sectional view" means when a cross-section taken by vertically cutting an object portion is viewed from the side.

Hereinafter, a battery pack according to an embodiment of the present invention will be described. However, the description will be made based on a portion of the battery pack, but the description is not necessarily limited thereto, and same or similar contents may be described based on the entire battery pack.

FIG. 1 illustrates a perspective view of a battery pack according to an embodiment of the present invention, FIG. 2 illustrates an exploded perspective view of the battery pack of FIG. 1.

Referring to FIG. 1 and FIG. 2, the battery pack 100 according to an embodiment of the present invention may include: pack frames 130 and 140 on which a plurality of battery modules 110 and 120 are mounted; a heat sink 200 positioned on a lower surface of the battery modules 110 and 120; and a heat transfer member 150 positioned between the heat sink 200 and the lower surfaces of the battery modules 110 and 120, and insulation members 310 and 320 may be attached to at least one end of the heat sink 200.

In addition, as illustrated in FIG. 2, the battery modules 110 and 120 include a plurality of first battery modules 110 and a plurality of second battery modules 120. Herein, the first battery modules 110 may be mounted in upper portions of the pack frames 130 and 140, and the second battery modules 120 may be mounted in lower portions of the pack frames 130 and 140.

Herein, the pack frames 130 and 140 may include an upper case 130 and a lower case 140 accommodating the first battery modules 110 and the second battery modules 120. For example, the upper case 130 and the lower case 140 may be fastened by bolt and nut coupling.

In addition, lowermost ends of the first battery modules 110 may be positioned higher than uppermost ends of the second battery modules 120. For example, the first battery modules 110 and the second battery modules 120 may form a layered structure. In other words, the first battery modules 110 may be positioned on an upper layer, and the second battery modules 120 may be positioned on a lower layer.

In addition, a number of second battery modules 120 included in the plurality of second battery modules 120 may be greater than a number of first battery modules 110 included in the first battery modules 110. For example, as illustrated in FIG. 2, two first battery modules 110 may be positioned on the upper layer, and four second battery modules 120 may be positioned on the lower layer.

In addition, a number of second battery modules 120 included in the plurality of second battery modules 120 may be greater than a number of first battery modules 110 included in the first battery modules 110. For example, as illustrated in FIG. 2, two first battery modules 110 may be positioned on the upper layer, and four second battery modules 120 may be positioned on the lower layer.

Accordingly, in the battery pack 100 according to the present embodiment, the battery modules 110 and 120 mounted in the battery pack 100 may be more compactly positioned by arranging a plurality of battery modules 110 and 120 in a layered structure.

In addition, a horizontal plate 160 positioned between the lower portions of the first battery modules 110 and the upper portions of the second battery modules 120 may be further included. In other words, the horizontal plate 160 may be provided between the first battery modules 110 provided on the upper layer and the second battery modules 120 provided on the lower layer, so as to distinguish the plurality of first battery modules 110 and the plurality of second battery modules 120 in a layered structure.

Accordingly, the battery pack 100 according to the present exemplary embodiment may include the horizontal plate 160 between the first battery modules 110 and the second battery modules 120 in the pack frames 130 and 140, thereby additionally securing durability of the battery pack 100 while separating spaces of upper and lower layers. In addition, it is possible to physically protect each of the battery modules 110 and 120 and other electrical components from external impact.

In addition, in the battery pack 100 of the present embodiment, a side plate 170 may be positioned adjacent to a side surface of the first battery module 110 positioned at an outermost side in the pack frames 130 and 140 among the first battery modules 110. In other words, the side plate 170 may be in contact with the side surface of the first battery module 110 provided at the outermost side in the pack frames 130 and 140 among the first battery modules 110. For example, the side plate 170 may be coupled, fastened, or attached to the side surface of the first battery module 110 positioned at the outermost side in the pack frames 130 and 140 among the first battery modules 110.

Herein, when positioned at the outermost side in the pack frames 130 and 140, it may indicate the outermost first battery module 110 when the first battery modules 110 are arranged side by side in the pack frames 130 and 140.

On the other hand, the side surface of the first battery module 110 positioned at the outermost side in the pack frames 130 and 140 among the first battery modules 110 may be exposed inside the pack frames 130 and 140.

However, in the present embodiment, the side plate 170 may be positioned adjacent to the side surface of the first battery module 110 positioned at the outermost side in the pack frames 130 and 140, so as to physically protect the first battery module 110 positioned at the outermost side in the pack frames 130 and 140 from external impact.

Hereinafter, the heat transfer member 150 and the insulating members 310 and 320 will be described in detail with a focus on the heat sink 200 included in the battery pack 100 of the present embodiment.

FIG. 3 illustrates an exploded perspective view of an insulating member attached to a heat sink included in the battery pack of FIG. 1 by disassembling the insulating member. FIG. 4 illustrates an exploded perspective view of a heat transfer member positioned on the heat sink of FIG. 3 by disassembling the heat transfer member.

Referring to FIG. 3 and FIG. 4, the insulating members 310 and 320 may be attached to at least one end of the heat sink 200. In addition, the insulating members 310 and 320 may be respectively attached to opposite ends of the heat sink 200. However, the positions or numbers of the insulating members 310 and 320 are not limited thereto, and the battery pack 100 may be positioned to have a position or number that is necessary to secure insulation performance.

For example, the insulating members 310 and 320 may be members made of a material such as polycarbonate. However, the present invention is not limited thereto, and any material having an insulating characteristic is not limited and is applicable.

In addition, the insulating members 310 and 320 are attached to the heat sink 200, and an adhesive layer (not illustrated) may be positioned between the insulating members 310 and 320 and the heat sink 200. For example, the adhesive layer (not illustrated) may be formed of a double-sided adhesive tape. However, any member capable of bonding between the insulating members 310 and 320 and the heat sink 200 may be used without being limited thereto.

In addition, the heat sink 200 may be positioned on the lower surfaces of the battery modules 110 and 120. More specifically, the heat sink 200 may include a first heat sink 210 and a second heat sink 220. Herein, the first heat sink 210 may be positioned on the lower surfaces of the first battery modules 110, and the second heat sink 220 may be positioned on the lower surfaces of the second battery modules 120.

More specifically, as illustrated in FIG. 2 to FIG. 4, two first battery modules 110 may be positioned on the upper layer, and when the four second battery modules 120 are positioned in the lower layer, the first heat sink 210 is positioned on the lower surfaces of the two first battery modules 110, and the second heat sink 220 may be positioned on lower surfaces of two pairs of second battery modules 120.

For example, the second heat sink 220 may have a structure in which a pair of first heat sinks 210 are positioned side by side to be connected to each other. Herein, according to such a structure in which elements are connected to each other, ends of the pair of first heat sinks 210 facing each other may be integrated with each other or may be connected by bonding such as welding.

In addition, the insulating members 310 and 320 may include a first insulating member 310 and a second insulating member 320. Herein, the first insulating member 310 may be attached to at least one end of the first heat sink 210, and the second insulating member 320 may be attached to at least one end of the second heat sink 220.

As an example, as illustrated in FIG. 2 to FIG. 4, the first insulating member 310 may include a first insulating portion 310a and a second insulating portion 310b, the first insulating portion 310a is attached to an end portion of the first heat sink 210 positioned adjacent to the side surfaces of the pack frames 130 and 140, and the second insulating portion 310b may be attached to an end portion of the first heat sink 210 positioned adjacent to the inside of the pack frames 130 and 140.

In addition, the second insulating member 320 may include a third insulating portion 320a and a fourth insulating portion 320b, the third insulating portion 320a is attached to opposite ends of the second heat sink 220 positioned adjacent to the side surfaces of the pack frames 130 and 140, and the fourth insulating part 320b may be attached to a center of the second heat sink 220. More specifically, as described above, when the second heat sink 220 has a structure in which the pair of first heat sinks 210 are positioned side by side and are connected to each other, the fourth insulating portion 320b may be respectively attached to end portions of the pair of first heat sinks 210 facing each other.

Accordingly, the insulating members 310 and 320 according to the present embodiment may sufficiently secure a space/creepage distance between the battery modules 110 and 120 and the heat sink on the heat sink 200, and may also improve insulating performance of the battery pack.

In addition, the heat transfer member 150 may be positioned between the heat sink 200 and the battery modules 110 and 120. More specifically, the heat transfer member 150 may extend along the lower surfaces of the battery modules 110 and 120 of the heat sink 200.

More specifically, as described above, when the second heat sink 220 has a structure in which the pair of first heat sinks 210 are positioned side by side and are connected to each other, the heat transfer members 150 are respectively positioned on the pair of first heat sinks 210, but may be spaced apart from each other.

Accordingly, in the present embodiment, the heat transfer member 150 may be positioned between the battery modules 110 and 120 and the heat sink 200 so that heat generated in each of the battery modules 110 and 120 may be easily discharged to the heat sink 200 through the heat transfer member 150, and thus cooling performance may also be improved.

FIG. 5 illustrates an enlarged view of a dotted line area in a state in which components of FIG. 2 are coupled. FIG. 6 schematically illustrates a cross-section of the dotted line area of FIG. 5.

Hereinafter, a partial cross-section will be described based on the second heat sink 220, but another cross-section of the second heat sink 220 or the first heat sink may be described in the same or similar manner.

Referring to FIG. 5 and FIG. 6, at least a portion of the third insulating portion 320a in the second insulating member 320 may be positioned between the heat transfer member 150 and the second heat sink 220. In other words, a remaining portion of the third insulating portion 320a in the second insulating member 320 may not be covered by the heat transfer member 150, and may be exposed inside the pack frames 130 and 140.

In addition, at least a portion of the third insulating portion 320a of the second insulating member 320 may cover an edge of an end portion of the second heat sink 220. In other words, at least a portion of the third insulating portion 320a of the second insulating member 320 may extend along a side surface of the end portion of the second heat sink 220.

Accordingly, the battery pack 100 according to the present embodiment may further secure a space/creepage distance between the battery module 120 and the heat sink 220, and insulation performance of the battery pack may be further improved.

FIG. 7 illustrates a perspective view of a first battery module of FIG. 2.

Referring to FIG. 7, in an embodiment of the present invention, the first battery module 110 may include a plurality of battery cells 111. More specifically, the battery cells 111 may be stacked in a predetermined direction and then mounted in the module frame 115 to configure the first battery module 110.

The battery cells 111 may be a pouch-type secondary battery or a prismatic secondary battery because there is no particular limitation on a type thereof, but is preferably a pouch-type secondary battery.

Meanwhile, since the battery module in the present invention has been described using the first battery module 110 as an example, the second battery module 120 (FIG. 2) may also have the same or similar structure to the first battery module 110 described above.

Meanwhile, the battery pack according to the present embodiment may be applied to various devices. Such devices may be applied to transportation means such as an electric bicycle, an electric vehicle, and a hybrid vehicle, but the present invention is not limited thereto, and is applicable to various devices that can use a battery module and a battery pack including the same, which also belongs to the scope of the invention.

While this invention has been described in connection with what is presently considered to be practical exemplary embodiment, it is to be understood that the invention is not limited to the disclosed embodiments, but, on the contrary, is intended to cover various modifications and equivalent arrangements included within the spirit and scope of greater than or equal to appended claims.

DESCRIPTION OF SYMBOLS

100: battery pack
110: first battery module
120: second battery module
130: upper case
140: lower case
150: heat transfer member
160: horizontal plate
170: side plate
200: heat sink
310: first insulating member
320: second insulating member

The invention claimed is:

1. A battery pack comprising:
a pack frame configured to accommodate a plurality of battery modules;
a heat sink positioned on lower surfaces of the plurality of battery modules; and
a heat transfer member positioned between the heat sink and the lower surfaces of the plurality of battery modules,
wherein an insulating member is attached to at least one end portion of the heat sink, and
wherein at least a portion of the insulating member extends along a side surface of the at least one end portion of the heat sink toward a bottom edge of the at least one end portion of the heat sink.

2. The battery pack of claim 1, wherein at least a portion of the insulating member is positioned between the heat transfer member and the heat sink.

3. The battery pack of claim 2, wherein at least a portion of the insulating member covers an edge of the at least one end portion of the heat sink.

4. The battery pack of claim 1, wherein the plurality of battery modules includes first battery modules and second battery modules, and
wherein the first battery modules are mounted in an upper portion of the pack frame, and the second battery modules are mounted in a lower portion of the pack frame.

5. The battery pack of claim 4, wherein the heat sink includes a first heat sink and a second heat sink, and
wherein the first heat sink is positioned on lower surfaces of the first battery modules, while the second heat sink is positioned on lower surfaces of the second battery modules.

6. The battery pack of claim 5, wherein the insulating member includes a first insulating member and a second insulating member,
wherein the first insulating member is attached to at least one end portion of the first heat sink, and
wherein the second insulating member is attached to at least one end portion of the second heat sink.

7. The battery pack of claim 6, further comprising a horizontal plate positioned between the first heat sink and upper portions of the second battery modules.

8. The battery pack of claim 7, wherein a number of the second battery modules is greater than a number of the first battery modules.

9. The battery pack of claim 8, wherein the second heat sink has a pair of heat sinks positioned side by side to be connected to each other.

10. The battery pack of claim 9, wherein the heat transfer member is positioned on each of the pair of heat sinks, to be spaced from each other.

11. The battery pack of claim 9, wherein the second insulating member is attached to each of opposite end portions of the pair of heat sinks.

12. A device comprising the battery pack according to claim 1.

13. The battery pack of claim 1, wherein the insulating member has an L-shaped cross section and contacts an upper surface and the side surface of the heat sink.

14. The battery pack of claim 6, wherein the second insulating member comprises edge sections extending along ends of the second heat sink and central portions extending across the second heat sink between the ends of the second heat sink.

15. The battery pack of claim 6, wherein the second insulating member has an L-shaped cross section and contacts an upper surface and the side surface of the second heat sink.

16. The battery pack of claim 13, wherein the heat transfer member contacts a top surface of the heat sink and a top surface of the insulating member.

17. The battery pack of claim 1, wherein the heat transfer member contacts a top surface of the heat sink and a top surface of the insulating member.

* * * * *